United States Patent [19]
Jakubowski, Jr.

[11] 3,887,150
[45] June 3, 1975

[54] INTERNAL EJECTOR MECHANISM

[75] Inventor: Thaddeus Jakubowski, Jr., Long Beach, Calif.

[73] Assignee: McDonnell Douglas Corporation, Santa Monica, Calif.

[22] Filed: May 20, 1974

[21] Appl. No.: 471,670

Related U.S. Application Data

[63] Continuation-in-part of Ser. No. 329,657, Feb. 5, 1973, abandoned.

[52] U.S. Cl. ............................ 244/137 R; 89/1.5 B
[51] Int. Cl. ............................................. B64c 1/22
[58] Field of Search.. 244/137 R; 294/83 R, 83 AA, 294/83 AE; 89/1.5 R, 1.5 B, 1.5 C, 1.5 F, 1.56

[56] References Cited
UNITED STATES PATENTS
3,787,012  1/1974  Jakubowski, Jr. ................ 244/137 R FOREIGN PATENTS OR APPLICATIONS
1,051,338  1/1954  France ............................ 244/137 R
979,155    4/1951  France ................................ 89/1.5 F
734,988    8/1955  United Kingdom ............. 244/137 R Primary Examiner—Trygve M. Blix
Assistant Examiner—Paul E. Sauberer
Attorney, Agent, or Firm—Robert O. Richardson; Walter J. Jason; Donald L. Royer

[57] ABSTRACT

An internal ejector mechanism for releasably fastening a separable unit to a carrier unit. The separable unit or store has a threaded well or cavity liner in which a disposable ejector fits. The ejector consists of an outer housing or cylinder, an ejector piston, an ejector piston retraction spring, a plunger actuator and cartridge cap with electrical contacts, and an explosive cartridge. The carrier unit contains a mounting bracket or lug having a plurality of latching balls radially movable through its cylindrical walls. When the balls are urged outwardly by a ball retention plunger they fit within a groove in the ejector housing to lock the separable unit to the carrier unit. The cartridge actuated piston moves the ball retention plunger to permit inward movment of the balls. This frees the ejector housing and releases the separable unit.

5 Claims, 3 Drawing Figures

3,887,150

INTERNAL EJECTOR MECHANISM

RELATED APPLICATION

This application is a continuation-in-part of application Ser. No. 329,657 filed Feb. 5, 1973 for Internal Ejector Mechanism, now abandoned.

BACKGROUND OF THE PRESENT INVENTION

Existing ejector devices are retained within an aircraft after the store is ejected, inflicting weight and drag penalties on the aircraft. Expended cartridges for ejecting the store must be removed and replaced with new cartridges before each flight, thus increasing turnaround time. There is an urgent need for a simple, rugged, lightweight, reliable attaching device for releasably connecting an external store to an aircraft.

SUMMARY OF THE PRESENT INVENTION

The internal ejector mechanism comprising the present invention provides a single point suspension, release, and ejection at the center of gravity of an externally carried store on an aircraft. It is cartridge actuated and when fired the store is unlocked from the suspension system and the ejector piston drives the store away from the aircraft. The internal ejector is an integral part of the store during transportation and storage, thus reducing logistics loading and carriage and delivery problems. This concept provides a single point suspension release and ejection through the center of gravity of the store so that a minimum of external bracing is required. The use of disposable ejector mechanisms eliminates maintenance of expensive heavyweight ejector mechanisms attached to the aircraft in order to carry the store. It eliminates the unloading of spent cartridges since the gas system is contained within the store to be ejected. The physical size and weight of the lug that remains with the aircraft is significantly less than present ejector units that are in use and thus there is less aerodynamic drag due to the small size of the lug remaining. Since cartridges are placed within the store prior to its use, the loading of the cartridges into ejector units immediately before using is eliminated.

Briefly, the ejector mechanism comprises a carrier unit lug mounted to the aircraft and a separable unit with disposable ejector in the store to be released. The carrier unit lug has a plurality of latching balls radially movable through its cylindrical walls. Outward movement of the balls urged outwardly by a ball retention plunger, fits them into a groove in the ejector housing in the store to lock the units together. A cartridge actuated piston moves the ball retention plunger to free the balls for inward movement. This releases the ejector housing and the separable unit is expended.

DETAILED DESCRIPTION OF THE PRESENT EMBODIMENT

Figure 1:
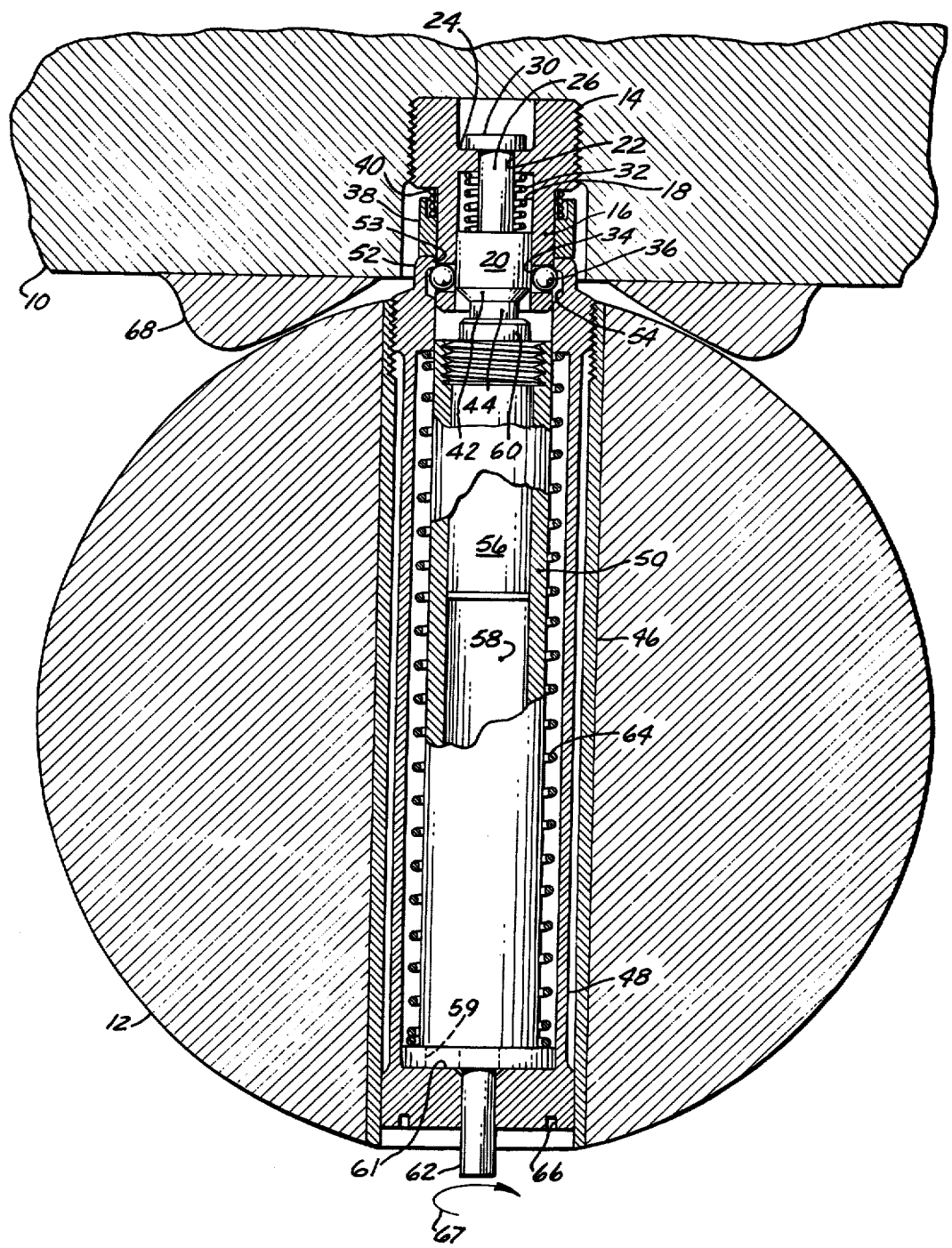
FIG. 1 is a vertical sectional view showing the attachment of the store to the aircraft.

Reference is now made to FIG. 1 wherein there is shown a portion of aircraft 10 to which a store 12 is to be releasably mounted. Within the aircraft a mounting lug 14 is threadedly secured. This lug has downwardly extending walls 16 defining a mounting lug cylinder having a bore 18 into which a ball retention plunger 20 is vertically movable. Spaced from the top of the lug is a bore 22 having a shoulder 24 spaced from the top of the lug. The ball retention plunger 20 has a shaft 26 passing through this opening 22 and terminating in an enlarged head portion 30 which seats on shoulder 24 to retain the ball retention plunger within the lug. A plunger spring 32 urges the ball retention plunger 20 downwardly in the position shown.

Figure 2:
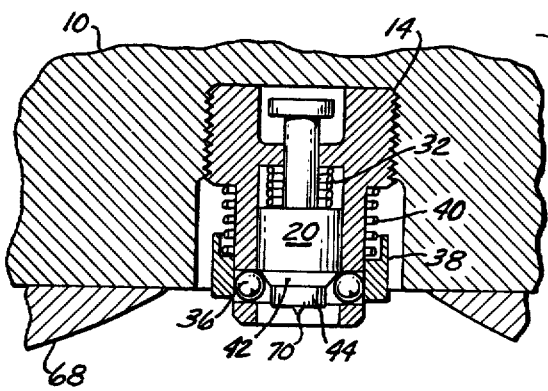
FIG. 2 is a vertical sectional view just after release has been initiated.
Figure 3:
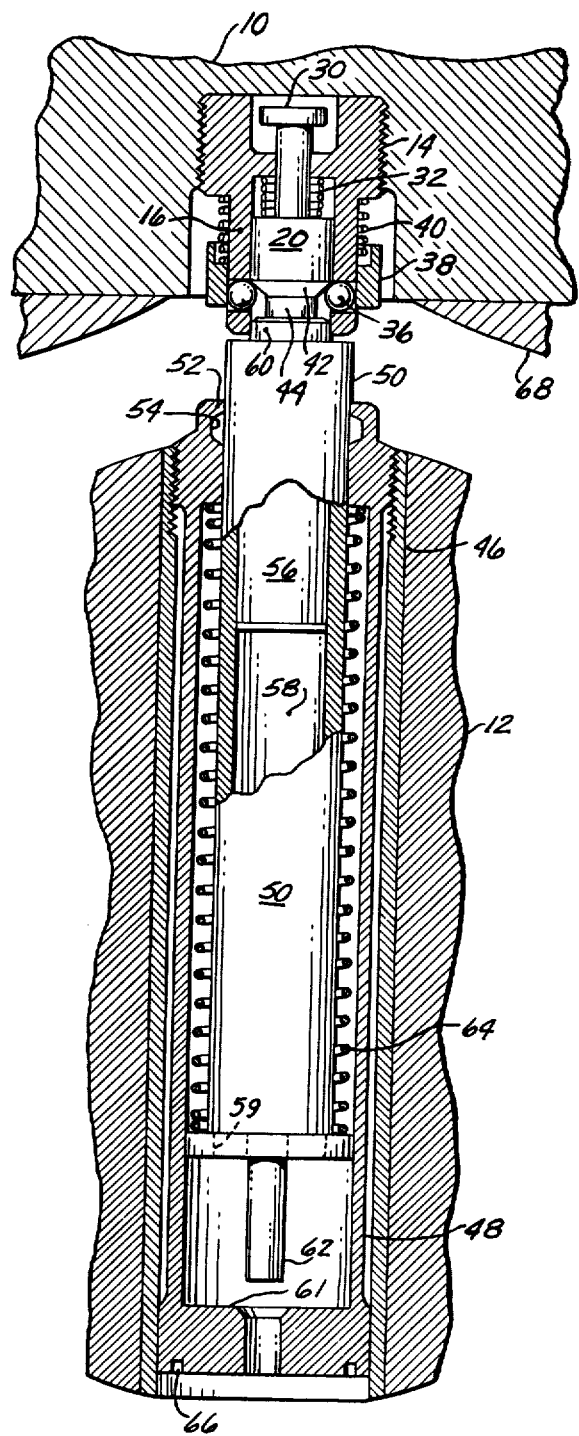
FIG. 3 is a vertical sectional view as the store and the ejector mechanism moves away from the aircraft.

At the downward end of the lug 14 are a plurality of openings 34 into which are mounted balls 36 which are slightly larger in diameter than the thickness of the wall 16 of the lug 14. A ball retention collar 38 telescopically moves vertically over the walls 16 and are urged downwardly by spring 40. The ball retention plunger 20 has a truncated conical portion 42 terminating in a shaft of reduced diameter 44. When the ball retention plunger 20 moves upwardly, the balls 36 may then be depressed inwardly due to the clearance provided by the shaft 44, as can be seen in FIGS. 2 and 3. The ball retention collar 38 urged by spring 40 passes down over these balls to retain them in their innermost position when this occurs.

Mounted within store 12, preferably through its center of gravity, is a cavity liner 46 to which is threadedly engageable a disposable ejector cylinder 48 having an ejection piston 50 vertically movable therein. Cylinder 48 terminates at its upper end in an ejector housing ring 52 with an inwardly directed flange 53 adapted to pass over the balls 36 which fit within the ejector housing groove 54, as shown, to retain the store 12 in its secured position. Within the ejection piston 50, at the top, is mounted a cartridge 56 of the gas expansion type which, when detonated, expands gases down into the air chamber 58 within the piston 50. Mounted on top of the cartridge is a plunger actuator 60 engageable with the ball retention plunger 20 for raising it upwardly against the action of plunger spring 32. This actuator 60 is threadedly attached to the top of piston 50 and is screwed down over cartridge 56 after it has been inserted. Air chamber 58 has orifices 59 at its bottom so expanding gases bear on surface 61 at the end of cylinder 48. A safety and manual release shaft 62 extends downwardly from cylinder 48 through an appropriate opening in the bottom of the cylinder 48. An ejection piston retraction spring 64 urges the ejection piston 50 downwardly, as shown. On the bottom surface of the base of the cylinder 48 are a plurality of recesses 66 so that engagement therewith with an appropriate tool, the cylinder 48 may be rotated within store 12 as shown by arrow 67. This is done after installation to thereby cause the store 12 to snug-up against the sway brace saddle 68 on the bottom surface of the aircraft 10.

The latching operation may be described as follows:

At the initial contact of the ejector housing ring 52 upwardly against the ball retention collar 38, the ball retention collar moves upwardly to permit the outward movement of balls 36 as ball retention plunger 20 moves downwardly to the position shown in FIG. 1. This outward movement of the latching balls 36 into the ejector housing groove 54 locks the store 12 to the aircraft 10. Sway bracing is then accomplished through the rotation of the ejector housing cylinder 48 which tightens the store 12 against the sway brace saddle 68.

For safety purposes a pin, not shown, may be inserted through shaft 62 to prevent its upward movement inadvertently.

The manual release of an unspent store may be accomplished simply by moving upward on release shaft 62 to move plunger actuator 60 against the ball retention plunger 20 to let balls 36 move inwardly. This frees them from the ejector housing ring 52 and permits store 12 to move downward and away from the aircraft 10.

The release and operation of the store ejection can best be understood with reference to FIGS. 2 and 3. It is first assumed that the store 12 is attached to aircraft 10 as shown in FIG. 1. When cartridge 56 is detonated, the expanding gases fill air chamber 58 and pass through orifices 59 to bear on surface 61 at the end of cylinder 48. This causes ejector piston 50 to lift. The plunger actuator 60 on top of piston 50 is also lifted against the ball retention plunger 20. This raises the plunger 20 bearing against spring 32 until the narrow shaft 44 of plunger 20 comes into horizontal alignment with the balls 36, permitting them to move inwardly against shaft 44. Further expansion of the gases from the cartridge 56 drives ejector piston 50 further upwardly against lug 14 to move store 12 out of engagement and away from the aircraft as the ejector housing ring 52 is freed from the balls 36. These latching balls 36 are retained in their innermost direction by the downward movement of ball retention collar 38 which moved down under force of spring 40 as housing ring 52 moves away from the balls.

In FIG. 3 the ejection piston retractor spring 64 is shown having returned piston 50 to its original downward position as the store 12 continues to move from the aircraft 10. The lug 14 in the aircraft 10 is ready for its next loading of another store with the latching balls 36 moved inwardly against the smaller diameter shaft 44 of the ball retention plunger 20. The plunger spring 32 is compressed, ready to exert downward movement on the plunger 20 and thence outward movement of the balls 36 upon raising of the ball retention collar 38 against spring 40 when the ejector housing ring 52 of the next store is raised into position. Electrical contact with the cartridge 56 is made through contact 70 at the base of plunger 20 as it makes contact with the plunger actuator 60 in the store.

Having thus described an illustrative embodiment of the present invention, it is to be understood that modifications thereof will become apparent to those skilled in the art and it is to be understood that these deviations are to be construed as part of the present invention.

I claim:

1. An internal ejector mechanism for releasably retaining a separable unit with a carrier unit, said mechanism comprising:
    a disposable ejector cylinder attached to said separable unit,
    a piston within said cylinder with a cartridge therein and a movable plunger actuator thereover,
    said cylinder terminating in an annular ejector housing ring with an inwardly directed flange,
    a mounting lug secured to said carrier unit, said lug having downwardly extending walls defining a mounting lug cylinder,
    a ball retention plunger vertically movable within said mounting lug cylinder and of substantially the same diameter size as that of the inner diameter of said mounting lug cylinder,
    said mounting lug cylinder having a plurality of openings into which are mounted balls adapted for radial movement therein,
    said plunger having a shaft of reduced diameter at its lower end to permit inward movement of said balls, said plunger having a truncated conical portion between its two diameters for urging said balls outwardly upon downward movement of said plunger,
    said balls fitting under said flange to retain said disposable ejector cylinder with said mounting lug,
    said cartridge being operable to move said plunger upwardly to free said balls from said flange to separate said units whereupon on actuation of said cartridge said piston moves relatively to said mounting lug cylinder to unlatch said units and also to impart a separation force therebetween.

2. An internal ejector mechanism as in claim 1 wherein a ball retention collar is mounted over said mounting lug cylinder for movement over said balls to keep said balls inwardly depressed until said ejector housing ring moves said collar upwardly and said balls move outwardly into a groove under said flange.

3. An internal ejector mechanism as in claim 2 wherein said ball retention collar is spring-urged downwardly over said balls.

4. An internal ejector mechanism as in claim 1 wherein said disposable ejector cylinder is threadedly mounted in said separable unit whereby threaded adjustment regulates spacing between said units when fastened together.

5. An internal ejector mechanism as in claim 4 wherein said carrier unit is an aircraft with a sway brace saddle extending therefrom and said separable unit is an externally mounted store positioned against said sway brace saddle.

* * * * *